US012531306B2

(12) United States Patent
Takahashi

(10) Patent No.: US 12,531,306 B2
(45) Date of Patent: Jan. 20, 2026

(54) POWER SUPPLY DEVICE, ELECTRIC VEHICLE USING SAME, AND POWER STORAGE DEVICE

(71) Applicant: SANYO Electric Co., Ltd., Osaka (JP)

(72) Inventor: Hiroyuki Takahashi, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 690 days.

(21) Appl. No.: 17/633,352

(22) PCT Filed: Jul. 20, 2020

(86) PCT No.: PCT/JP2020/028025
§ 371 (c)(1),
(2) Date: Feb. 7, 2022

(87) PCT Pub. No.: WO2021/039197
PCT Pub. Date: Mar. 4, 2021

(65) Prior Publication Data
US 2022/0294064 A1 Sep. 15, 2022

(30) Foreign Application Priority Data

Aug. 29, 2019 (JP) .................................. 2019-157259

(51) Int. Cl.
H01M 50/264 (2021.01)
H01M 50/209 (2021.01)
(Continued)

(52) U.S. Cl.
CPC ....... H01M 50/264 (2021.01); H01M 50/209 (2021.01); H01M 50/242 (2021.01);
(Continued)

(58) Field of Classification Search
CPC ............. H01M 50/264; H01M 50/249; H01M 50/209; H01M 50/242; H01M 50/517; H01M 2220/20
See application file for complete search history.

(56) References Cited

U.S. PATENT DOCUMENTS

2012/0298433 A1* 11/2012 Ohkura ............. H01M 10/6556
180/65.21
2013/0004822 A1* 1/2013 Hashimoto ....... H01M 10/6554
429/120
(Continued)

FOREIGN PATENT DOCUMENTS

JP 2017-195018 10/2017
JP 2018006273 * 1/2018 .......... H01M 50/209
(Continued)

OTHER PUBLICATIONS

International Search Report of PCT application No. PCT/JP2020/028025 dated Oct. 20, 2020.
English translation of Search Report dated Dec. 23, 2023, issued in counterpart CN Application No. 202080055121.X. (3 pages).
English Translation of Search Report dated Aug. 14, 2024, issued in counterpart CN Application No. 202080055121. X. (3 pages).

Primary Examiner — Matthew T Martin
Assistant Examiner — Taylor Harrison Krone
(74) Attorney, Agent, or Firm — WHDA, LLP

(57) ABSTRACT

Power supply device is a power supply device to be fixed to a power supply target equipment. Power supply device includes: a plurality of battery cells each having a prismatic outer covering can; a pair of end plates that covers both side end faces of a battery stack in which the plurality of battery cells are stacked; lower plate that covers a lower face of the battery stack; a plurality of fastening members that are sheets extending in a stacking direction of the plurality of battery cells and are arranged on opposed side faces of the battery stack to fasten end plates to each other in a state where the battery stack is placed on an upper surface of lower plate; a plate fixing mechanism for fixing lower plate (Continued)

to the power supply target equipment; and a connecting structure for connecting lower plate and fastening member to each other in a state where the displacement between lower plate and fastening member is allowed.

11 Claims, 14 Drawing Sheets

(51) Int. Cl.
  *H01M 50/242* (2021.01)
  *H01M 50/249* (2021.01)
  *H01M 50/517* (2021.01)
(52) U.S. Cl.
  CPC ....... *H01M 50/249* (2021.01); *H01M 50/517* (2021.01); *H01M 2220/20* (2013.01)

(56) References Cited

U.S. PATENT DOCUMENTS

| | | | | |
|---|---|---|---|---|
| 2018/0138559 | A1* | 5/2018 | Omura | B60L 50/66 |
| 2019/0334145 | A1 | 10/2019 | Omura et al. | |
| 2020/0122301 | A1* | 4/2020 | Rathmann | H01M 50/105 |
| 2021/0050572 | A1 | 2/2021 | Omura et al. | |

FOREIGN PATENT DOCUMENTS

| | | | | |
|---|---|---|---|---|
| JP | 2018-073543 A | | 5/2018 | |
| JP | 6390721 B2 | * | 9/2018 | ......... H01M 50/209 |
| JP | 2019-090225 A | | 6/2019 | |
| WO | 2016/174855 | | 11/2016 | |
| WO | 2018/012224 | | 1/2018 | |

* cited by examiner

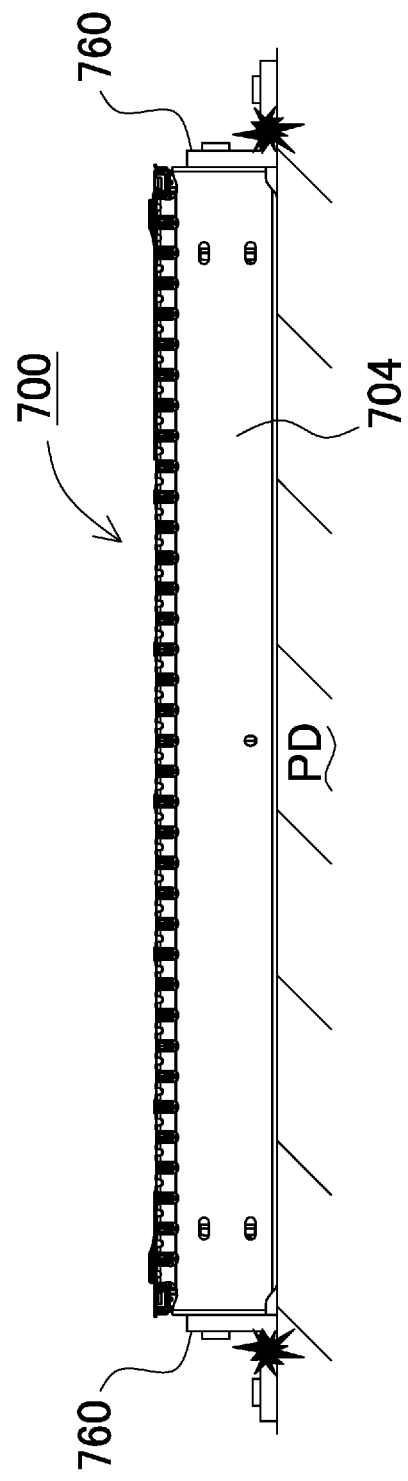

POWER SUPPLY DEVICE, ELECTRIC VEHICLE USING SAME, AND POWER STORAGE DEVICE

TECHNICAL FIELD

The present invention relates to a power supply device, and an electric vehicle and a power storage device using the same.

BACKGROUND ART

A power supply device is used as a power supply device for driving an electric vehicle, a power supply device for storing power, and the like. In such a power supply device, a plurality of chargeable and dischargeable battery cells are stacked. It has been known that an outer covering can of a battery cell swells due to charging and discharging. In general, as illustrated in a perspective view of FIG. 12, in power supply device 900, end plates 903 are disposed on both end surfaces of a battery stack in which battery cells 901 of rectangular outer covering cans and insulating spacers 902 are alternately stacked, and end plates 903 are fastened to each other by bind bars 904 made of metal. Further, as shown in FIG. 13, such a power supply device 900 is fixed to an electric vehicle or the like by fastening end plates or bind bars to the electric vehicle or the like by bolts via brackets 960.

On the other hand, with a recent demand for a power supply device having higher capacity, the number of stacked battery cells that forms a battery stack tends to increase. In such a configuration, amounts of expansion of each battery cell are accumulated to increase an elongation amount of the battery stack as a whole. As a result, there exists a problem that a large load is applied to a fixing point of a bracket for fixing a power supply device to an electric vehicle or the like. For example, as compared with power supply device 900 having such a length shown in a side view of FIG. 13, when the number of stacked battery cells is increased as in power supply device 700 shown in a side view of FIG. 14, amount of extension is accumulated corresponding to the number of stacked battery cells. As a result, a stress load applied to a fixing point of bracket 760 that fixes power supply device 700 becomes excessively large thus giving rise to the occurrence of fatigue and deterioration of power supply device 900.

In the configurations illustrated in FIG. 13 and FIG. 14, brackets 960, 760 are fixed to bind bars 904, 704, respectively, that fasten the battery cells. As a length of the battery stack is increased, the bind bars that receive a swelling force are also elongated so that an elongation amount of the bind bars increases whereby a stress on the brackets further increases.

In preparing a bracket or a bolt adapted to such an elongation amount, a material of the bracket should be changed to an expensive type, and a plate thickness, a bolt diameter or the number of bolts should be increased, or the like. Accordingly, there arise problems such as increase in cost and weight.

CITATION LIST

Patent Literature

Patent Literature 1: WO2018/012224

SUMMARY OF THE INVENTION

One of the objects of the present invention is to provide a power supply device configured to prevent a large load from being applied to a fixing structure that is fixed to an electric vehicle or the like even when a battery stack becomes long, and an electric vehicle and a power storage device using the power supply device.

A power supply device according to one aspect of the present invention is a power supply device to be fixed to a power supply target equipment, the power supply device including: a plurality of battery cells each having an outer covering can of a prismatic shape; a pair of end plates that covers both side end faces of a battery stack in which the plurality of battery cells are stacked; a lower plate that covers a lower face of the battery stack; a plurality of fastening members that are plates extending along a stacking direction of the plurality of battery cells and are arranged on opposed side faces of the battery stack, the fastening members configured to fasten the end plates to each other in a state where the battery stack is placed on an upper face of the lower plate; and a plate fixing mechanism for fixing the lower plate to a power supply target equipment; and a connecting structure configured to connect the lower plate and the fastening members to each other in a state where the displacement between the lower plate and the fastening members is allowed.

Due to the above-mentioned configuration, by adopting the structure where the lower plate that is not affected by the swelling is fixed to the power supply target equipment by the plate fixing mechanism, instead of the end plate and the fastening member that are affected by the swelling of the battery cell, the power supply device can be stably fixed to the power supply equipment while avoiding a situation that a stress concentrates on the plate fixing mechanism due to the swelling or contraction of the battery cell.

BRIEF DESCRIPTION OF THE DRAWINGS

FIG. 14 is a side view illustrating a state in which a power supply device having an elongated battery stack is fixed to an electric vehicle or the like via a bracket.

DESCRIPTION OF EMBODIMENTS

Figure 1:
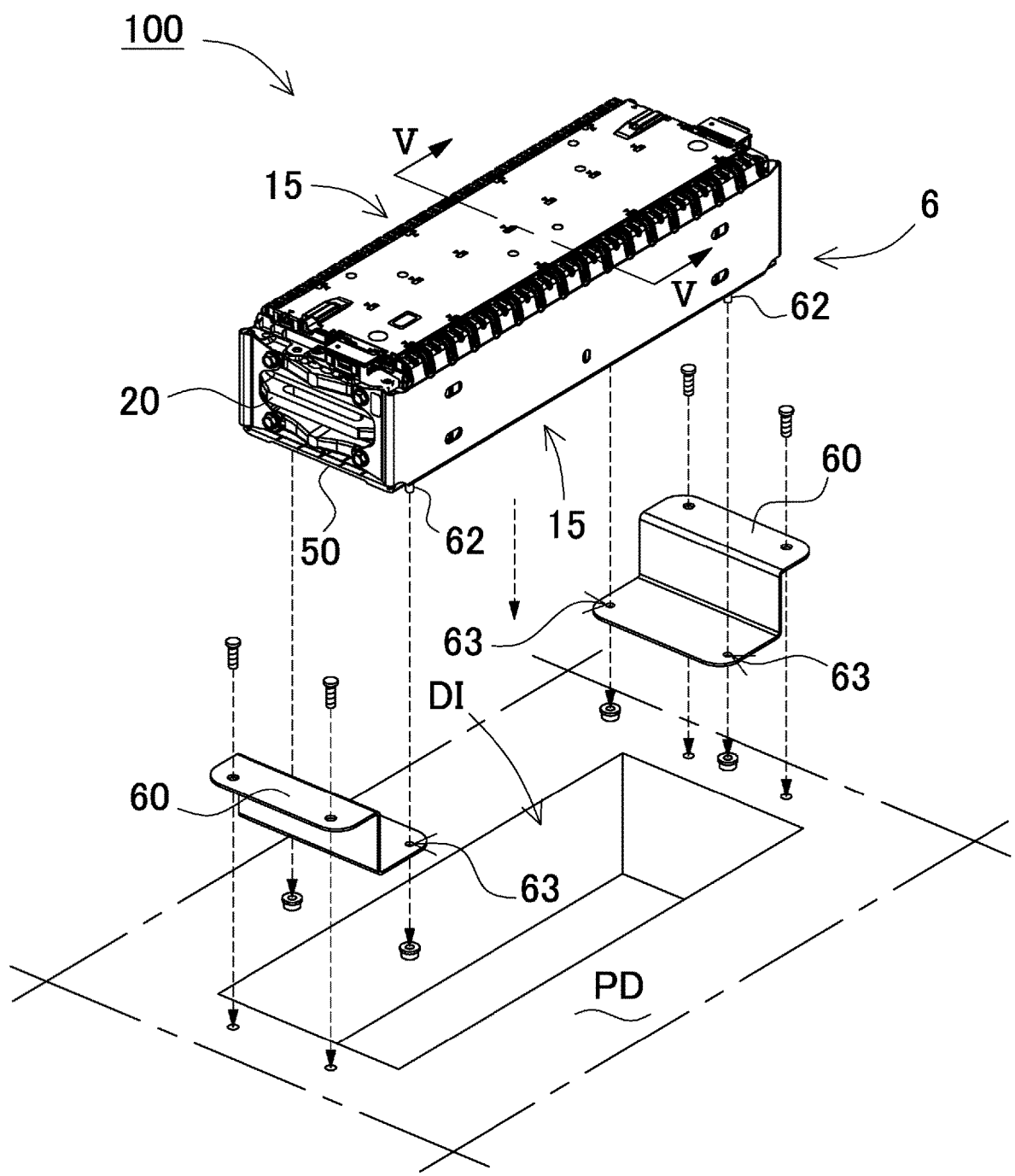
FIG. 1 is an exploded perspective view illustrating a state in which a power supply device according to a first exemplary embodiment is fixed to a power supply target equipment.

Exemplary embodiments of the present invention may be specified by the following configurations.

In the power supply device according to one exemplary embodiment of the present invention, the plate fixing mechanism is a fixing jig for fixing the lower plate to a bracket for fixing the lower plate to the power supply target equipment.

A power supply device according to another exemplary embodiment of the present invention is a power supply device to be fixed to a power supply target equipment, and includes: a plurality of battery cells each having an outer covering can of a prismatic shape; a pair of end plates that covers both side end faces of a battery stack in which the plurality of battery cells are stacked; a lower plate that covers a lower face of the battery stack; a plurality of fastening members that are plates extending along a stacking direction of the plurality of battery cells and are arranged on opposed side faces of the battery stack to fasten the end plates to each other in a state where the battery stack is placed on an upper face of the lower plate; a bracket for fixing the lower plate to the power supply target equipment; a fixing jig for fixing the lower plate and the bracket to each other; and a connecting structure for connecting the lower plate and the fastening members to each other in a state where the displacement of the lower plate and the fastening members is allowed. Due to the above-mentioned configuration, by adopting the structure where the lower plate that is not affected by the swelling is fixed to the bracket by the fixing jig, and the power supply device is fixed to the power supply target equipment via the bracket instead of the end plate and the fastening member that are affected by the swelling of the battery cell. Accordingly, the power supply device can be stably fixed to the power supply equipment while avoiding a situation that a stress concentrates on the bracket due to swelling or contraction of the battery cell.

Further, in the power supply device according to another exemplary embodiment of the present invention, the bracket is fixed in an orientation that the bracket protrudes from each of the pair of end plates.

Further, the power supply device according to another exemplary embodiment of the present invention is configured such that the plate fixing mechanism is formed of a plate fixing screw hole formed in the lower plate, a bracket fixing hole opened in the bracket, and a plate fixing bolt inserted into the plate fixing screw hole and the bracket fixing hole, and an upper surface of the plate fixing bolt inserted into the plate fixing screw hole and the bracket fixing hole is lower in height than a main surface of the lower plate. Due to the above-mentioned configuration, the plate fixing bolt is prevented from protruding from the plate fixing screw hole to the upper surface in a state where the lower plate is fixed to the bracket by the plate fixing mechanism and hence, it is possible to avoid a situation where displacement of the battery stack due to swelling or contraction of the battery cell on the upper surface of the lower plate is hindered by the plate fixing bolt.

Further, in the power supply device according to another exemplary embodiment of the present invention, the connecting structure includes: an elongated hole formed in either one of the fastening member or the lower plate and extended along a stacking direction of the plurality of battery cells; a hole part formed in the other of the fastening member and the lower plate at a position corresponding to the elongated hole; and an elongated hole screw passing through the elongated hole and the hole part and threadedly engaged in a state where the relative displacement between the lower plate and the fastening member at an interface therebetween is allowed. Due to the above-mentioned configuration, it is possible to maintain the connection state between the lower plate and the fastening member while allowing the displacement between the fastening member and the lower plate at the interface therebetween caused by the swelling and the contraction of the battery cells.

Furthermore, in the power supply device according to another exemplary embodiment of the present invention, the connecting structure further includes: a round hole formed at a center part in the stacking direction of the plurality of battery cells in either one of the fastening member or the lower plate; and a round hole screw threadedly engaged at a position corresponding to the round hole in the other of the fastening member and the lower plate, the elongated hole is formed in both end parts in the stacking direction of the plurality of battery cells in either one of the fastening member and the lower plate, and the elongated hole screws are threadedly engaged at positions corresponding to the elongated holes respectively in the other of the fastening member and the lower plate. Due to the above-mentioned configuration, while fixing the battery cell at the center of the battery stack in the longitudinal direction where the displacement is small by the threadedly engagement between the round hole and the round hole screw, at the end parts of the battery pack where the displacement is relatively large, by forming the elongated hole, it is possible to allow the slight displacement in the longitudinal direction.

Furthermore, in the power supply device according to another exemplary embodiment of the present invention, the plate fixing mechanism and the connecting structure are coaxially formed. The plate fixing screw hole forming the plate fixing mechanism and formed in the lower plate is a hole part forming the connecting structure and formed in the lower plate. A plate fixing bolt forming the plate fixing mechanism and inserted into the plate fixing screw hole and the bracket fixing hole is an elongated hole screw that is made to pass through the hole part that forms the connecting structure and is threadedly engaged in a state where the relative displacement between the lower plate and the fastening member at an interface therebetween is allowed.

Further, the power supply device according to another exemplary embodiment of the present invention further includes a heat transfer sheet interposed between the upper surface of the lower plate and the lower surface of the battery stack to bring the lower plate and the battery stack into a heat-bonded state.

Still further, in the power supply device according to another exemplary embodiment of the present invention, the heat transfer sheet is formed of an insulating member having an elasticity.

Further, in the power supply device according to another exemplary embodiment of the present invention, an aspect ratio of a rectangular shape as viewed in a plan view of the battery stack is equal to or more than 5.

Further, an electric vehicle according to another exemplary embodiment of the present invention includes: any one of the above-mentioned power supply devices; a traveling motor to which electric power is supplied from the power supply device; a vehicle main body on which the power supply device and the motor are mounted; and wheels that are driven by the motor to make the vehicle main body travel.

Further, a power storage device according to another exemplary embodiment of the present invention includes: any one of the above-mentioned power supply devices; and a power supply controller that controls charging to and discharging from the power supply device, in which the power supply controller enables charging to the battery cell with electric power from the outside and controls the battery cell to perform charging.

Hereinafter, exemplary embodiments of the present invention will be described with reference to the drawings. However, exemplary embodiments described below are examples for embodying the technical idea of the present invention, and the present invention is not limited to the following. Further, in the present specification, members indicated in the claims are not limited to the members of the exemplary embodiments. In particular, it is not intended to limit the scope of the present invention to sizes, materials, shapes of constituent components, relative arrangement of the components, and the like that are described in the exemplary embodiments, unless otherwise specified. The sizes, materials, shapes of the constituent components, and the relative arrangement of the components are mere explanation examples. The sizes and positional relationships of the members illustrated in the respective drawings may be exaggerated for clarity of the description. Further, in the following description, the same names and reference numerals indicate the same or similar members, and detailed description will be appropriately omitted. Further, respective elements forming the present invention may be configured such that the plurality of elements are formed of the same member to form one member that functions as the plurality of elements, or conversely, the function of one member can be shared and realized by the plurality of members. In addition, the contents described in some examples and exemplary embodiments can be used in other examples and exemplary embodiments.

The power supply device according to exemplary embodiments can be used in various applications including a power supply that is mounted in a hybrid vehicle, an electric automobile, or other electric vehicles to supply electric power to a traveling motor, a power supply that stores power generated by natural energy such as photovoltaic power generation and wind power generation, and a power supply for storing midnight power. In particular, the power supply device can be used as a power supply suitable for high power and high current applications. In an example below, exemplary embodiments in which the power supply device is applied to a power supply device for driving an electric vehicle will be described.

FIRST EXEMPLARY EMBODIMENT

Figure 2:
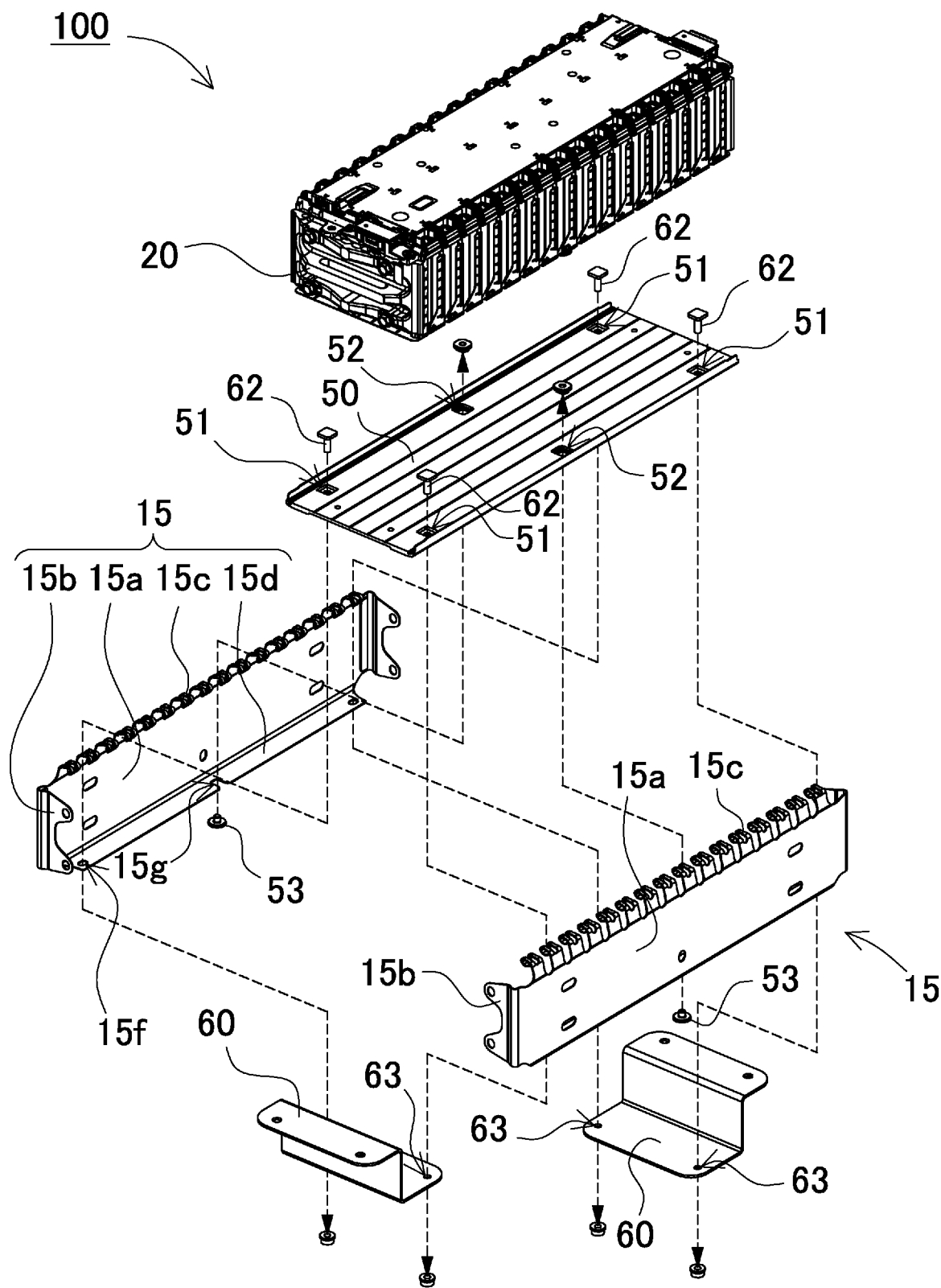
FIG. 2 is an exploded perspective view of the power supply device in FIG. 1 as viewed from obliquely above.
Figure 3:
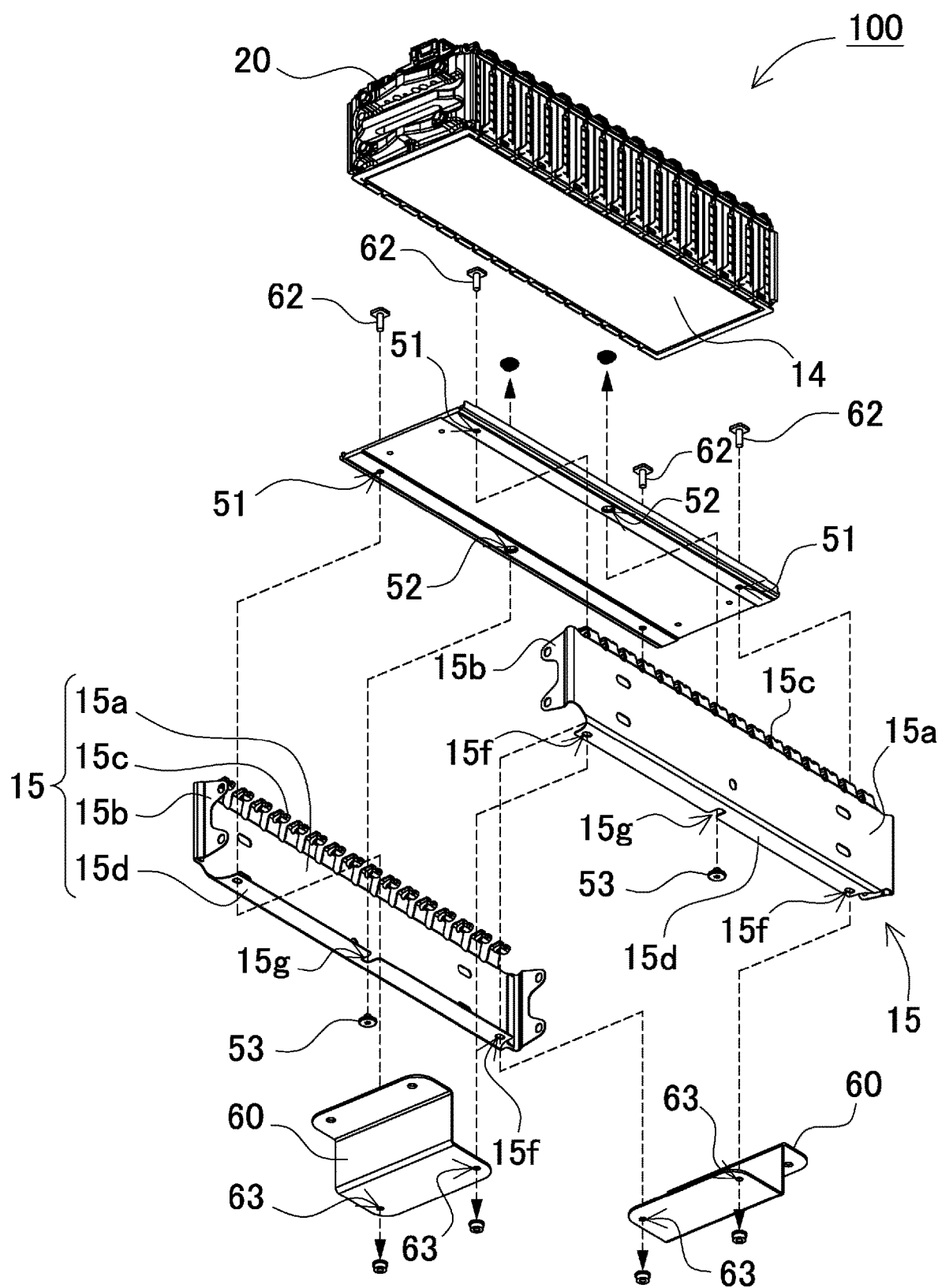
FIG. 3 is an exploded perspective view of the power supply device in FIG. 2 as viewed from obliquely below.
Figure 4:
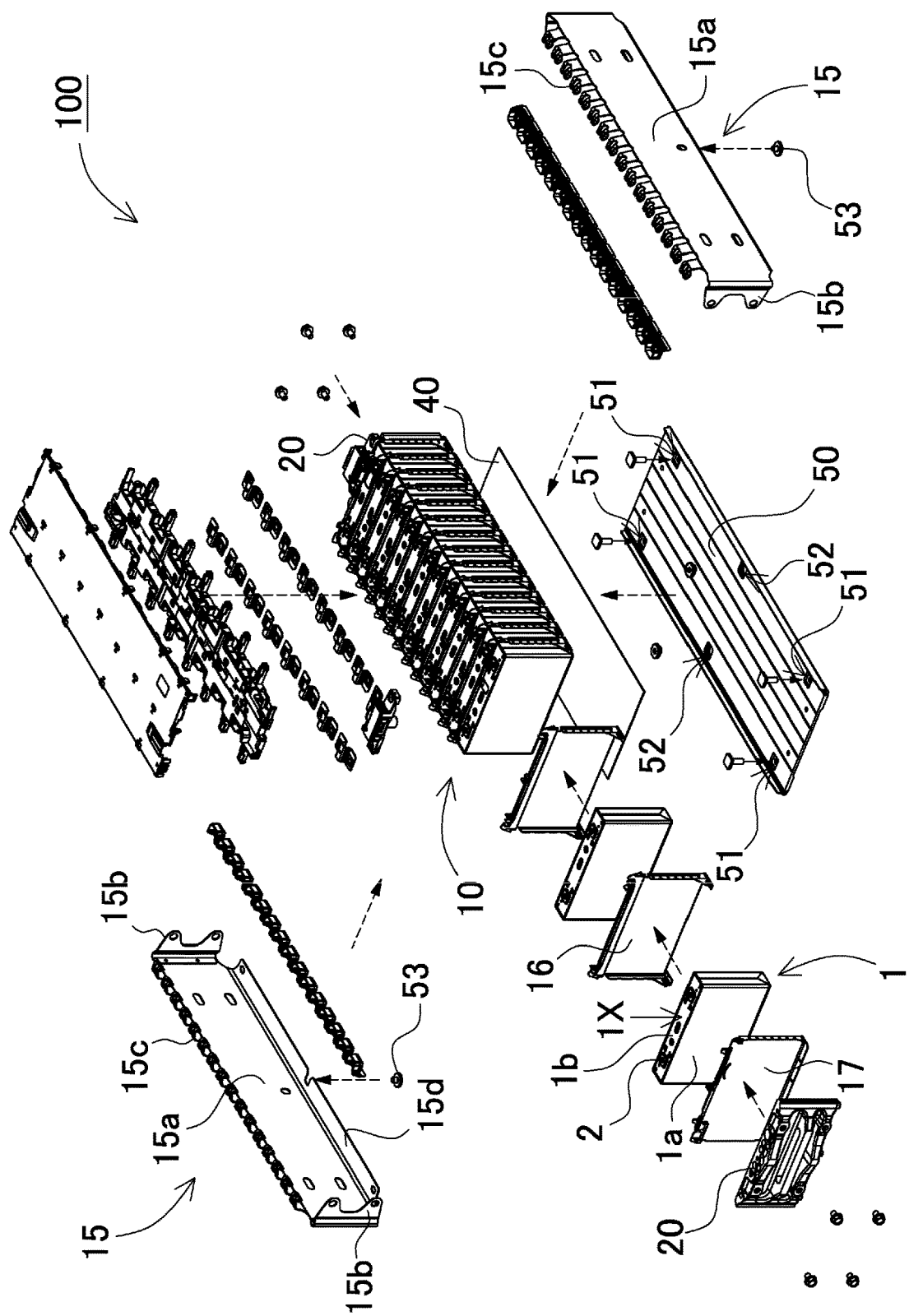
FIG. 4 is an exploded perspective view of the power supply device in FIG. 2.
Figure 5:
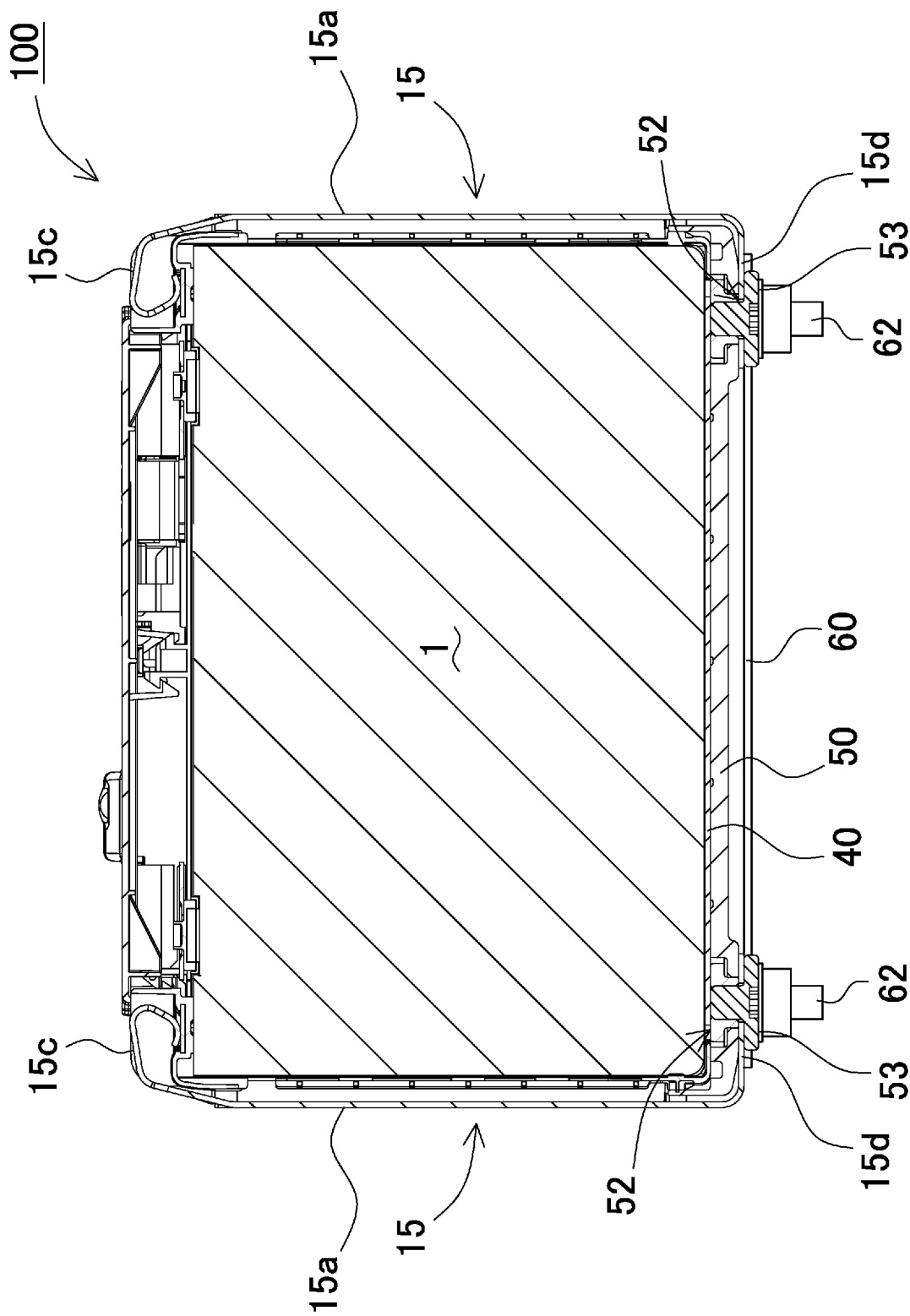
FIG. 5 is a vertical cross-sectional view of the power supply device taken along a line V-V in FIG. 1.
Figure 6:
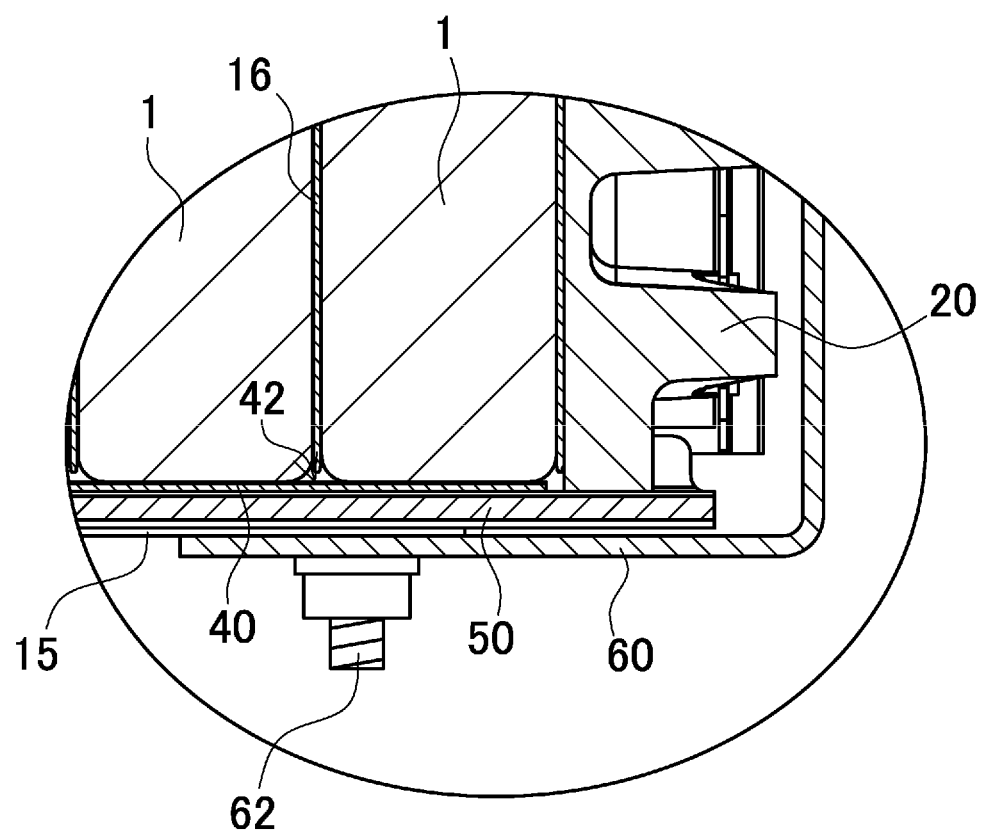
FIG. 6 is an enlarged cross-sectional view illustrating a heat transfer sheet according to a modified example.
Figure 7:
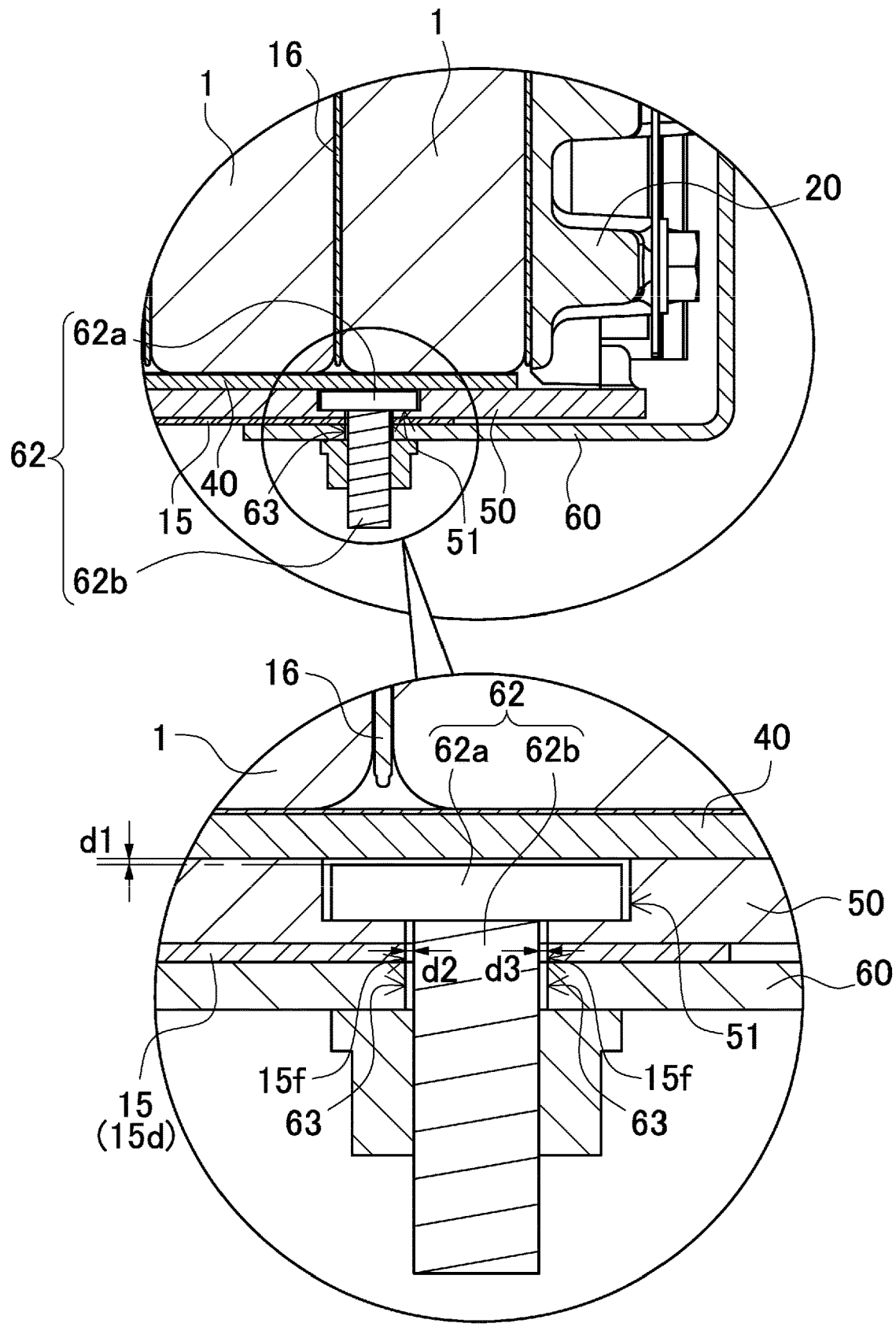
FIG. 7 is an enlarged cross-sectional view of a main part illustrating a plate fixing mechanism and a connecting structure in FIG. 1.
Figure 8:
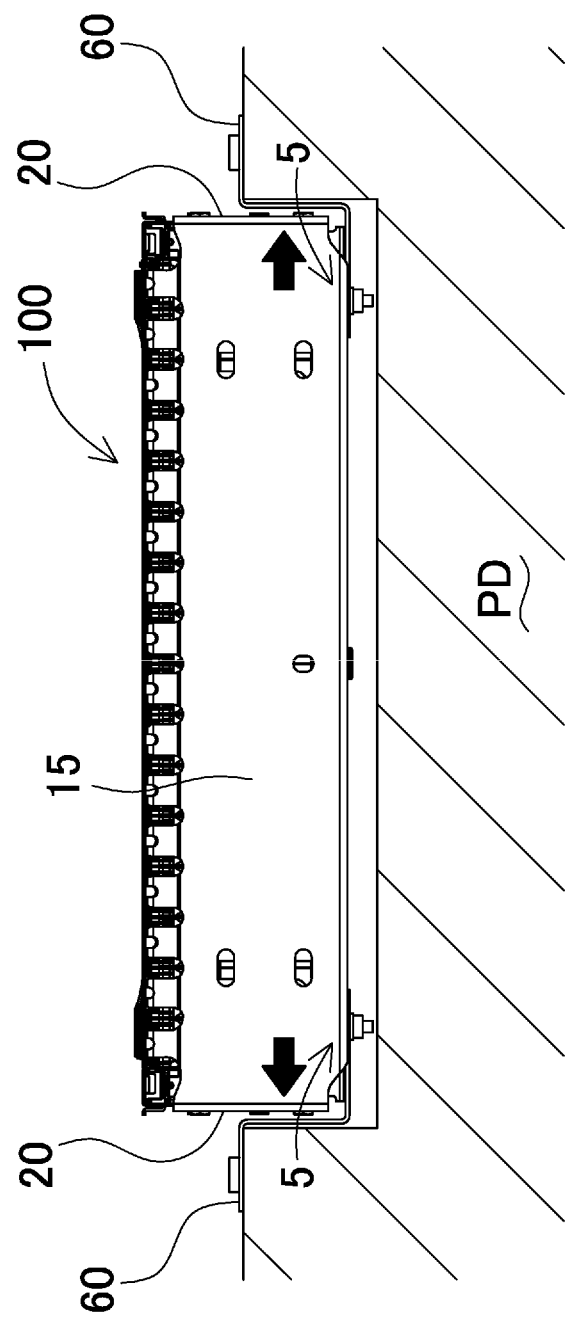
FIG. 8 is a schematic side view illustrating a state in which a battery stack is displaced in the power supply device in FIG. 1.

Power supply device 100 according to a first exemplary embodiment of the present invention is shown in FIG. 1 to FIG. 8. In these drawings, FIG. 1 is an exploded perspective view illustrating a state in which power supply device 100 according to a first exemplary embodiment is fixed to power supply target equipment PD, FIG. 2 is an exploded perspective view of power supply device 100 in FIG. 1 as viewed from obliquely above, FIG. 3 is an exploded perspective view of power supply device 100 in FIG. 2 as viewed from obliquely below, FIG. 4 is a further exploded perspective view of power supply device 100 in FIG. 2, FIG. 5 is a vertical cross-sectional view of power supply device 100 taken along a line V-V in FIG. 1, FIG. 6 is an enlarged cross-sectional view illustrating heat transfer sheet 40 according to a modified example, FIG. 7 is an enlarged cross-sectional view of a main part illustrating a plate fixing mechanism and a connecting structure in FIG. 1, and FIG. 8 is a schematic side view illustrating a state in which battery stack 10 is displaced in power supply device 100 in FIG. 1.

Power Supply Target Equipment PD

Power supply device 100 is fixed to power supply target equipment PD such as an electric vehicle via brackets 60. In the example of FIG. 1, power supply device 100 is housed in recessed part DI formed in the electric vehicle, and both ends in the longitudinal direction of power supply device 100 are fixed via brackets 60.

Bracket 60

As illustrated in FIG. 2 and FIG. 3, bracket 60 is formed of a metal piece bent in a stepwise manner, and is fixed in an orientation that bracket 60 protrudes from each of the pair of end plates 20 in a state where brackets 60 are fixed to power supply device 100. A shape of bracket 60 is one example, and any shape that enables fixing to the power supply target equipment can be used. Further, the power supply device may be directly fixed to power supply target equipment PD without using the bracket. In the power supply device in the present specification, the brackets are arbitrary. Accordingly, the present invention includes both a case where the power supply device includes the brackets and a case where the power supply device does not include the brackets. FIG. 2 and FIG. 3 illustrate power supply device 100 including brackets 60. FIG. 4 illustrates power supply device 100 that do not include brackets.

In power supply device 100, as illustrated in FIG. 1, plate fixing mechanism 6 for fixing power supply device 100 to power supply target equipment PD is provided to lower plate 50 (details will be described later). When power supply device 100 is fixed to power supply target equipment PD using brackets 60, plate fixing mechanism 6 serves as a fixing jig for fixing lower plate 50 to brackets 60.

Power Supply Device 100

As illustrated in FIG. 2 to FIG. 4, power supply device 100 includes battery stack 10 in which the plurality of battery cells 1 are stacked, the pair of end plates 20 covering both side end faces of battery stack 10, battery-side plate 14 disposed on a bottom surface of battery stack 10, the plurality of fastening members 15 that fasten end plates 20 to each other, heat transfer sheet 40 having a lower surface on which battery stack 10 is disposed, and lower plate 50 disposed on the lower surface of heat transfer sheet 40.

Fastening member 15 is formed in a plate shape extended in the stacking direction of the plurality of battery cells 1. Fastening members 15 are arranged on opposed side faces of battery stack 10, and fasten end plates 20 to each other in a state where battery stack 10 is placed on an upper surface of lower plate 50.

Battery-side plate 14 is disposed closer to the bottom surface of battery stack 10, and is fixed to fastening members 15. Battery-side plate 14 is made of a metal sheet or the like. Further, battery-side plate 14 and the bottom surface of battery stack 10 are insulated from each other via an insulating sheet or the like interposed therebetween.

Lower plate 50 causes battery stack 10 placed on the upper surface of lower plate 50 via heat transfer sheet 40 to dissipate heat. Further, heat transfer sheet 40 is interposed between the upper surface of lower plate 50 and the lower surface of battery stack 10 to stabilize a heat-bonded state between lower plate 50 and battery stack 10. As a result, even when battery stack 10 generates heat due to charging or discharging of battery cells 1, the heat is transferred to lower plate 50 via heat transfer sheet 40 and is radiated.

Battery Stack 10

As illustrated in FIG. 2 to FIG. 4, battery stack 10 includes the plurality of battery cells 1 each having positive and negative electrode terminals 2, and bus bars (not illustrated in the drawings) that are connected to electrode terminals 2 of the plurality of battery cells 1 to connect the plurality of battery cells 1 in parallel and in series. The plurality of battery cells 1 are connected in parallel and in series through the bus bars. Battery cell 1 is a chargeable and dischargeable secondary battery. In power supply device 100, the plurality of battery cells 1 are connected in parallel to form a parallel battery group, and a plurality of parallel battery groups are connected in series. Accordingly, a large number of battery cells 1 are connected in parallel and in series. In power supply device 100 illustrated in FIG. 4, the plurality of battery cells 1 are stacked to form battery stack 10. Further, the pair of end plates 20 is disposed on both end faces of battery stack 10. End parts of fastening members 15 are fixed to end plates 20 to fix stacked battery cells 1 to a pressurized state.

Battery Cell 1

Battery cell 1 is a prismatic battery having a main surface as a wider surface with a square outer shape and having a fixed cell thickness, the thickness being smaller than a width. Further, battery cell 1 is a secondary battery that can be charged and discharged, and is a lithium ion secondary battery. In the present invention, however, the battery cells are neither limited to prismatic batteries nor to lithium ion secondary batteries. As the battery cell, besides a lithium ion secondary battery, all chargeable batteries such as a non-aqueous electrolyte secondary battery, a nickel metal hydride battery cell and the like can be also used.

In battery cell 1, an electrode assembly in which positive and negative electrode plates are stacked is housed in outer covering can 1a, and outer covering can 1a is filled with an electrolyte and outer covering can is airtightly sealed. Outer covering can 1a is molded into a prismatic cylindrical shape that closes at a bottom, and an upper opening part of the outer covering can is airtightly closed by sealing plate 1b of a metal sheet. Outer covering can 1a is manufactured by deep-drawing a metal sheet made of aluminum, an aluminum alloy or the like. Sealing plate 1b is manufactured using a sheet made of metal, such as aluminum or an aluminum alloy, in the same manner as outer covering can 1a. Sealing plate 1b is inserted into the opening part of outer covering can 1a, and sealing plate 1b is airtightly fixed to outer covering can 1a by laser welding such that a laser beam is irradiated to a boundary between an outer periphery of sealing plate 1b and an inner periphery of outer covering can 1a.

Electrode Terminal 2

In battery cell 1, as illustrated in FIG. 4, and the like, sealing plate 1b as a top face is used as terminal face 1X, and positive and negative electrode terminals 2 are fixed to both end parts of terminal face 1X. Electrode terminal 2 has a protrusion having a circular columnar shape. However, the protrusion is not necessarily required to have a circular columnar shape but may have a polygonal columnar shape or an elliptic columnar shape.

The positions at which positive and negative electrode terminals 2 fixed to sealing plate 1b of battery cell 1 are set to positions where the positive electrode and the negative electrode are arranged in right and left symmetry. With such a configuration, by stacking battery cells 1 in a right and left reversed manner and by connecting electrode terminals 2 disposed adjacent and close to each other and serving as the positive electrode and the negative electrode to each other by a bus bar as illustrated in FIG. 4 and the like, battery cells 1 disposed adjacently to each other can be connected in series. The present invention does not limit the number and a connection state of the battery cells that form the battery stack. The number and the connection states of the battery cells that form the battery stack may be modified in various manners, inclusive of other exemplary embodiments described later.

The plurality of battery cells 1 are stacked such that a thickness of each battery cell 1 corresponds to the stacking direction to form battery stack 10. In battery stack 10, the plurality of battery cells 1 are stacked such that terminal faces 1X on which positive and negative electrode terminals 2 are provided, or sealing plates 1b in FIG. 4, are flush with each other.

In battery stack 10, insulating spacer 16 may be interposed between battery cells 1 stacked adjacently to each other. Insulating spacer 16 is made of an insulating material such as resin in the form of a thin plate or sheet. Insulating spacer 16 is formed to have a plate shape that is substantially equal in size to an opposed face of battery cell 1. Such insulating spacer 16 can be stacked between battery cells 1 adjacent to each other to insulate the adjacent battery cells 1 from each other. As a spacer arranged between adjacent battery cells, it is possible to use a spacer having a shape that allows a flow path through which a cooling gas flows to be formed between the battery cell and the spacer. It is also possible to cover a surface of battery cell 1 with an insulating material. For example, the surface of the outer covering can except for the electrode parts of the battery cell may be covered by a shrink film such as a polyethylene terephthalate (PET) resin. In this case, the insulating spacer may be omitted. In a power supply device in which a plurality of battery cells have multi-parallel or multi-serial connection, while an insulating spacer may be interposed between the battery cells connected in series to each other to insulate them from each other, an insulating spacer between the battery cells connected in parallel to each other may be omitted because of no difference in voltage between adjacent outer covering cans.

In power supply device 100 illustrated in FIG. 4, end plates 20 are arranged on both end faces of battery stack 10. End face spacer 17 may also be interposed between end plate 20 and battery stack 10 to insulate the two. End face spacer 17 can also be manufactured in the form of a thin plate or sheet with an insulating material such as resin.

In power supply device 100 according to the first exemplary embodiment, in battery stack 10 in which the plurality of battery cells 1 are stacked on each other, electrode terminals 2 of the plurality of battery cells 1 adjacent to each other are connected by the bus bars to connect the plurality of battery cells 1 in parallel and in series. A bus bar holder may be disposed between battery stack 10 and the bus bars.

Use of the bus bar holder makes it possible to dispose the plurality of bus bars at fixed positions on the upper surface of the battery stack while insulating the plurality of bus bars from each other and insulating the terminal faces of the battery cells from the bus bars.

The bus bar is made by cutting and processing a metal sheet to have a predetermined shape. As the metal sheet for forming the bus bar, a sheet of metal that is light and has low electrical resistance, such as a sheet of aluminum, a sheet of copper, or a sheet of an alloy of these metals can be used. However, for the metal sheet of the bus bar, other metals or their alloys having a low electric resistance and being lightweight can also be used.

End Plate 20

As shown in FIG. 4, end plates 20 are disposed at both ends of battery stack 10 and fastened with each other via a pair of right and left fastening members 15 that are disposed along both side faces of battery stack 10. End plates 20 are both ends of battery stack 10 in the stacking direction of battery cells 1, and are disposed outside end face spacer 17 to sandwich battery stack 10 from both ends.

Fastening Member 15

Fastening member 15 has both ends fixed to end plates 20 disposed on both end faces of battery stack 10. End plates 20 are fixed by a plurality of fastening members 15 to fasten battery stack 10 in the stacking direction. As shown in FIG. 2 to FIG. 4, fastening members 15 are each made of metal having a predetermined width and a predetermined thickness along the side face of battery stack 10, and are arranged so as to oppose both side faces of battery stack 10. A metal sheet of such as iron, preferably a steel plate, can be used as fastening member 15. Fastening member 15 made of a metal sheet is bent by press molding or the like to form a predetermined shape.

As shown in the exploded perspective view of FIG. 4, fastening member 15 is provided with end plate locking pieces 15b bent in an L shape at end parts in a longitudinal direction of fastening main surface 15a, that is, at both ends in a stacking direction of battery stack 10. End plate locking pieces 15b are screwed into end plates 20 to fix end plates 20 to each other.

As illustrated in the exploded perspective view of FIG. 4 and the vertical cross-sectional view of FIG. 5, a lower end of fastening main surface 15a of fastening member 15 is bent into an L shape to form lower plate connecting member 15d. Further, an upper end of fastening main surface 15a is bent to form pressing members 15c that press the end of the upper surface of battery stack 10. As described above, fastening members 15 cover the upper and lower surfaces of battery stack 10 from the corners on the left and right side faces of battery stack 10.

Pressing members 15c are separated for each battery cell such that upper surfaces of battery cells 1 of battery stack 10 can be individually pressed. With such a configuration, each pressing member 15c can press battery cell 1 toward lower plate 50 independently from adjacent pressing member 15c. In this way, each battery cell 1 is held in a height direction in a state where battery cell 1 is prevented from floating from lower plate 50 and hence, even when vibrations, impacts, or the like are applied to battery stack 10, each battery cell 1 can be maintained so as not to be displaced in the vertical direction.

As for the shape of fastening members 15 and the structure for fastening with end plates 20, known structures can be appropriately used. For example, both ends of the fastening member may be formed into a flat plate shape without bending into an L shape, and may be screwed with side faces of the end plate. Alternatively, with a part of the fastening member opposed to the side face of the end plate used as an engaging structure for engagement in a stepped manner, the fastening member being engaged with the side face of the end plate by the engaging structure may be further screwed.

Power supply device 100 having a large number of battery cells 1 stacked is configured such that the plurality of battery cells 1 are constrained by connecting end plates 20 arranged at both ends of battery stack 10 including the plurality of battery cells 1 by means of fastening members 15. By constraining the plurality of battery cells 1 via end plates 20 and fastening members 15 that have high rigidity, it is possible to suppress malfunction or other faults caused by swelling, deformation, relative displacement, or vibration of battery cells 1 due to charging and discharging or degradation.

Insulating sheet is interposed between fastening member 15 and battery stack 10. Insulating sheet is made of a material having insulating properties, such as a resin or the like, and insulates fastening member 15 made of metal and battery cells 1.

The insulating sheet is unnecessary in a case where the battery stack or a surface of the battery stack is insulated, for example, in a case where the battery cell is housed in an insulating case or covered with a heat-shrinkable tube made of a resin, or in a case where an insulating paint or coating is applied to a surface of the fastening member, or in a case where the fastening member is made of an insulating material. Further, the insulating sheet may be configured to be used also as the above-described bus bar holder for holding the bus bar.

Heat Transfer Sheet 40

Heat transfer sheet 40 is made of a material having excellent thermal conductivity while having insulating properties. Further, heat transfer sheet 40, which has elasticity or flexibility, is pressed to be deformed between lower plate 50 and battery stack 10, and adheres at the interfaces without a gap to bring about a heat-bonded state. As such heat transfer sheet 40, a silicone resin or the like can be preferably used. Further, a filler such as aluminum oxide may be added to increase thermal conductivity.

Low Friction Resistance Region 42

Further, it is preferable to provide a low frictional resistance region 42 for reducing frictional resistance with battery stack 10 on an upper surface of heat transfer sheet 40. As such low frictional resistance region 42, for example, a sliding sheet as another member may be disposed on the upper surface of heat transfer sheet 40 as illustrated in a cross-sectional view of FIG. 6. The sliding sheet should be made of a material with less frictional resistance than heat transfer sheet 40. As a result, when battery stack 10 is displaced on the upper surface of heat transfer sheet 40 due to swelling or contraction, the sliding sheet can be slid on the upper surface of heat transfer sheet 40 to avoid generation of wrinkles and maintain the heat-bonded state. As such a sliding sheet, for example, a polyethylene terephthalate (PET) film is preferable, and a biaxially stretched polyethylene terephthalate film is particularly suitable.

Further, a region for limiting frictional resistance may be provided on a surface of the heat transfer sheet. For example, the frictional resistance is reduced by subjecting the surface of heat transfer sheet to surface treatment or processing such as fluororesin coating. Alternatively, grease or oil may be applied to the surface of heat transfer sheet.

Lower Plate 50

Lower plate 50 covers the lower surface of battery stack 10. As lower plate 50, a heat radiation plate or the like made of metal having excellent thermal conductivity can be used. Further, lower plate 50 may be internally provided with a cooling mechanism such as a refrigerant circulation path. This allows battery stack 10 to efficiently dissipate heat and to be cooled by refrigerant cooling, and allows heat transfer sheet 40 to suitably maintain the heat-bonded state between battery stack 10 and lower plate 50.

Fixing Jig

Lower plate 50 includes plate fixing mechanism 6 for fixing the power supply device to power supply target equipment PD. As described above, in the example illustrated in FIG. 1 to FIG. 3, plate fixing mechanism 6 is a fixing jig for fixing bracket 60. In the example illustrated in FIG. 2 and FIG. 3, the fixing jig is formed of: plate fixing screw hole 51 formed in lower plate 50; bracket fixing hole 63 opened in bracket 60; and plate fixing bolt 62 inserted into plate fixing screw hole 51 and bracket fixing hole 63. Plate fixing bolt 62 includes screw head 62a and screw groove part 62b. Here, as illustrated in the enlarged cross-sectional view of FIG. 7, plate fixing bolt 62 inserted into plate fixing screw hole 51 of lower plate 50 and bracket fixing hole 63 of bracket 60 is configured such that the upper surface of plate fixing bolt 62 is lower in height than the main surface of lower plate 50. Specifically, as illustrated in the enlarged view of the main part of FIG. 7, an upper surface of screw head 62a of plate fixing bolt 62 is designed to be lower in height than the main surface of lower plate 50 by a height d1. Due to the above-mentioned configuration, in a state where lower plate 50 is fixed to bracket 60 by the plate fixing mechanism, plate fixing bolt 62 is prevented from protruding from plate fixing screw hole 51 to the upper surface of lower plate 50. Accordingly, while allowing the displacement of battery stack 10 due to swelling or contraction of battery cells 1 on the upper surface of lower plate 50 by the connecting structure described later, it is possible to avoid a situation where the sliding of battery cells 1 is obstructed by plate fixing bolts 62.

Connecting Structure 5

Further, as illustrated in the enlarged cross-sectional view of FIG. 7 and the side view of FIG. 8, power supply device 100 includes connecting structure 5 for connecting lower plate 50 and fastening member 15 to each other in a state where the displacement between lower plate 50 and fastening member 15 is allowed. As a result, power supply device 100 can be stably fixed to power supply target equipment PD without transmitting the displacement due to the swelling and contraction of battery cells 1 to lower plate 50.

In particular, in such long power supply device 700 having a large number of stacked battery cells as shown in FIG. 14, since an amount of displacement of the entire length of the battery stack due to swelling and contraction of the battery cells is large, a large load is applied to bracket 760 that fixes power supply device 700 to power supply target equipment PD. For example, when the number of battery cells increases from 12 cells to 36 cells, an amount of elongation becomes about 2.7 times, and a stress load increases proportionally thereto. The power supply device including plate fixing mechanism 6 and connecting structure 5 described above is advantageous over such an elongated power supply device. Specifically, it is effective for the elongated power supply device having a rectangular aspect ratio of 5 or more as viewed in a plan view of battery stack 10. For example, it is possible to avoid a situation in which a large load is applied to a fixing structure for fixing, to power supply target equipment, power supply device having battery stack 10 with a long side of about 1 m to 1 m 20 cm and a short side of about 140 mm to 170 mm.

Connecting structure 5 includes, for example, an elongated hole formed in one of fastening member 15 and lower plate 50, a hole part formed in the other of fastening member 15 and lower plate 50, and an elongated hole screw inserted into the elongated hole and the hole part. In the example illustrated in the cross-sectional view of FIG. 7, the elongated hole is formed in fastening member 15, and the hole part is formed in lower plate 50. The elongated hole is extended in the stacking direction of the plurality of battery cells. Further, the hole part is formed at a position corresponding to the elongated hole. By inserting and threadedly engaging the elongated hole screw into and with the elongated hole and the hole part, it is possible to allow the relative displacement between lower plate 50 and fastening member 15 at the interface therebetween.

It is preferable that connecting structure 5 include a round hole formed in either one of fastening member 15 and lower plate 50, a second hole part formed in the other of fastening member 15 and lower plate 50, and a round hole screw inserted into the round hole and the second hole part. In the example illustrated in the exploded perspective views of FIG. 3 and FIG. 4, the round hole (cutout 15g described later) is formed in fastening member 15, and second hole part 52 is formed in lower plate 50. The round hole is formed at the center part in the stacking direction of the plurality of battery cells 1. In the example of FIG. 3 and the like, the round hole is formed at the center in the longitudinal direction of fastening member 15, and an elongated hole is formed on both end sides respectively. As described above, as connecting structure 5, the center of the battery stack 10 in the longitudinal direction is fixed by forming the round hole at the center of the fastening member 15 and the elongated hole is formed in the end parts of the fastening member 15 on both sides where the swelling and contraction of battery stack 10 are cumulatively increased. Accordingly, the fastening members 15 and the lower plates 50 can be connected to each other in a state where, as shown in FIG. 8, the elongation and the contraction toward both ends of battery stack 10 is allowed and the sliding of battery stack 10 on lower plate 50 is allowed.

Further, it is preferable that plate fixing mechanism 6 and connecting structure 5 be coaxially formed. That is, by commonizing the screw and the screw hole forming plate fixing mechanism 6 and the screw and the screw hole forming connecting structure 5, it is possible to perform connection between lower plate 50 and battery stack 10 and fixing between lower plate 50 and bracket 60 at one place so that the configuration can be simplified and the number of parts can be reduced. In the example illustrated in FIG. 7, plate fixing screw holes 51 that form plate fixing mechanism 6 and are formed in lower plate 50 function as hole parts forming connecting structure 5. Plate fixing bolts 62 inserted into plate fixing screw holes 51 and bracket fixing holes 63 that form plate fixing mechanism 6 function as elongated hole screws that form connecting structure 5.

The connecting structure 5 illustrated in FIG. 3 and FIG. 4 is formed of: cutout 15g which is a round hole formed in lower plate connecting member 15d of fastening member 15; fastening member screw hole 15f which is an elongated hole; plate fixing screw hole 51 and second hole part 52 which are formed in lower plate 50; and plate fixing bolt 62 and round hole screw 53 which are made to pass through plate fixing screw hole 51 and second hole part 52. In this example, cutout 15g is formed, as the round hole, in an intermediate part of lower plate connecting member 15d. However, it is needless to say that a through hole may be formed instead of the cutout.

In connecting structure 5, as illustrated in FIG. 7, plate fixing bolt 62 is threadedly engaged with fastening member screw hole 15f formed in lower plate connecting member 15d of fastening member 15 and plate fixing screw hole 51 formed on lower plate 50. By forming fastening member screw hole 15f into an elongated hole elongated in the extending and contracting direction of battery stack 10, the sliding at an interface between lower plate 50 and fastening member 15 is allowed while threadedly engaging lower plate 50 and fastening member 15 with each other In this example, gaps d2, d3 are formed between an inner surface of fastening member screw hole 15f and a periphery of screw groove part 62b of plate fixing bolt 62. Even when battery stack 10 extends by an amount of gaps d2, d3, the extension of battery stack 10 is prevented from being transmitted to lower plate 50, and the load on the fixing structure between lower plate 50 and power supply target equipment PD via bracket 60 can be reduced.

Power supply device 100 described above can be used as a power supply for a vehicle that supplies electric power to a motor that enables an electric vehicle to travel. As an electric vehicle on which power supply device 100 is mounted, an electric vehicle such as a hybrid automobile or a plug-in hybrid automobile that travels by both an engine and a motor, or an electric automobile that travels only by a motor can be used, and is used as a power supply of these vehicles. Note that an example will be described in which in order to obtain electric power for driving the electric vehicle, a large number of power supply devices 100 described above are connected in series or in parallel, and a large-capacity, high-output power supply device to which a necessary controlling circuit is further added is constructed.

Power Supply Device for Hybrid Vehicle

Figure 9:
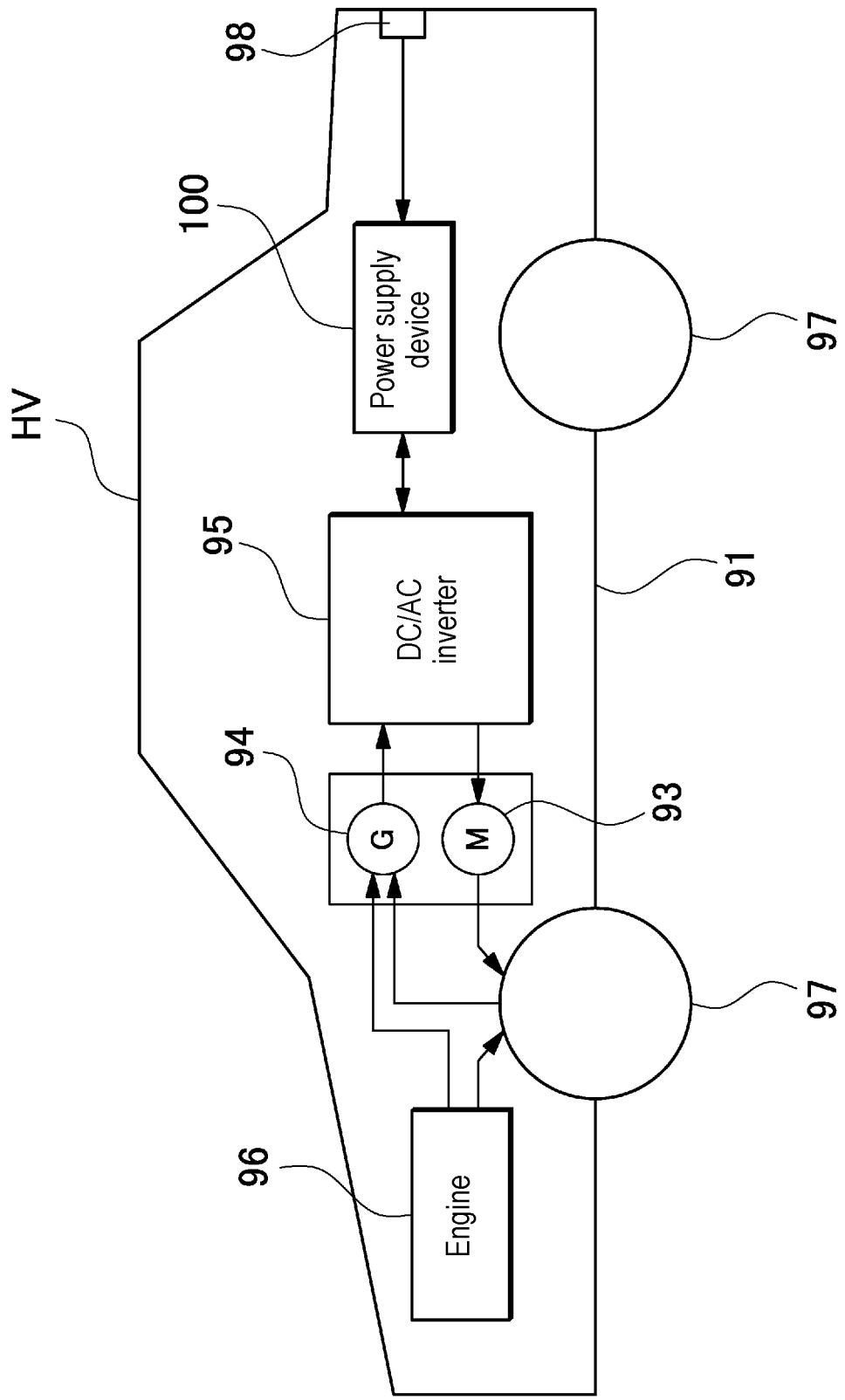
FIG. 9 is a block diagram illustrating an example in which a power supply device is mounted on a hybrid vehicle that travels by an engine and a motor.

FIG. 9 illustrates an example in which power supply device 100 is mounted on a hybrid automobile that travels by both an engine and a motor. Vehicle HV on which power supply device 100 illustrated in this drawing is mounted includes vehicle main body 91, engine 96 and travel motor 93 that cause vehicle main body 91 to travel, wheels 97 that are driven by engine 96 and traveling motor 93, power supply device 100 that supplies electric power to motor 93, and power generator 94 that charges a battery of power supply device 100. Power supply device 100 is connected to motor 93 and power generator 94 via DC/AC inverter 95. Vehicle HV travels by both motor 93 and engine 96 while charging or discharging the battery of power supply device 100. Motor 93 is driven in a region where an engine efficiency is low, for example, during acceleration or low-speed traveling, and causes the vehicle to travel. Motor 93 is driven by electric power supplied from power supply device 100. Power generator 94 is driven by engine 96 or by regenerative braking generated at the time of applying braking to the vehicle, and charges the battery of power supply device 100. As illustrated in FIG. 9, vehicle HV may include charging plug 98 for charging power supply device 100. By connecting charging plug 98 to an external power supply, it is possible to charge power supply device 100.

Power Supply Device for Electric Automobile

Figure 10:
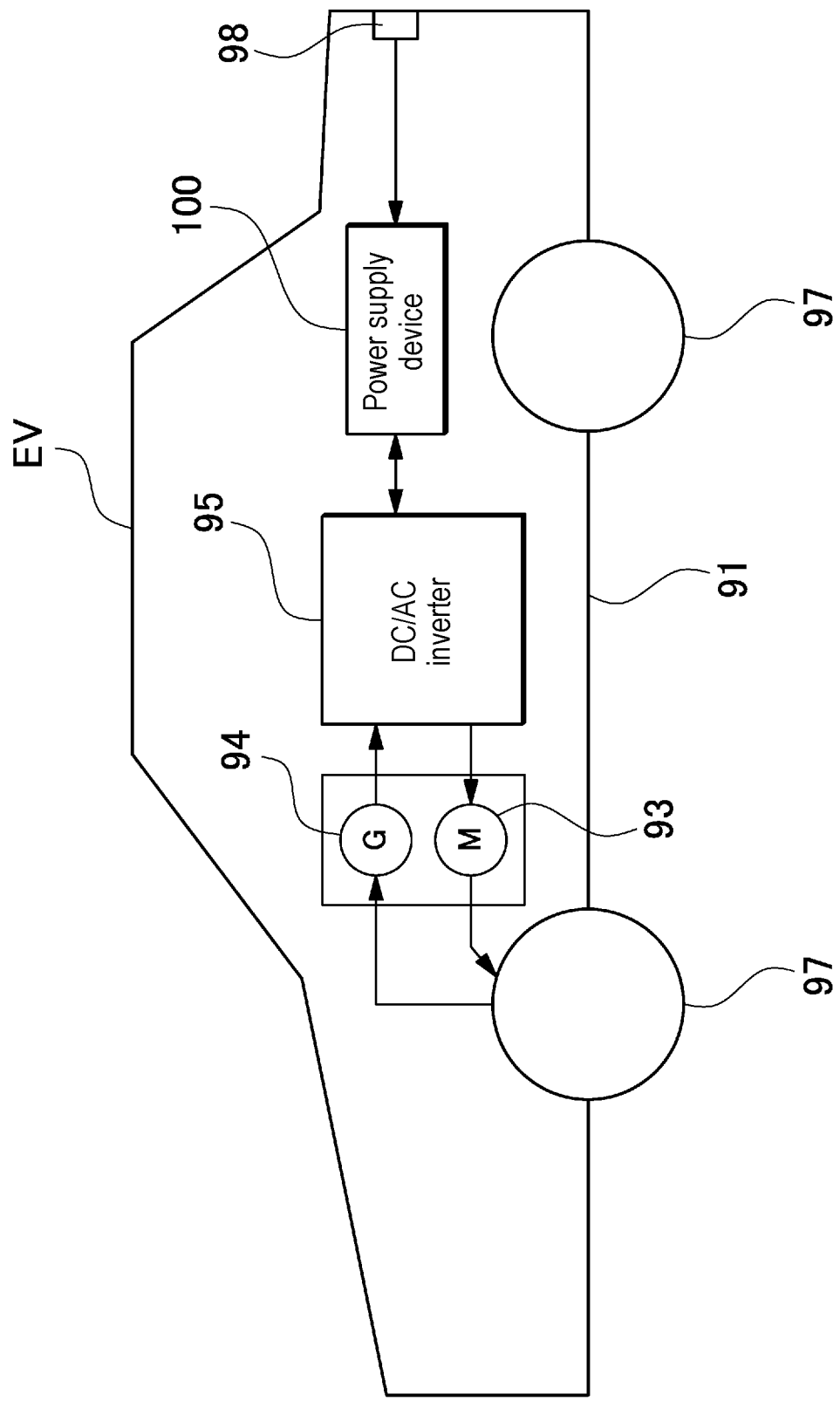
FIG. 10 is a block diagram illustrating an example in which a power supply device is mounted on an electric automobile that travels only by a motor.

FIG. 10 illustrates an example in which power supply device 100 is mounted on an electric automobile that travels only by a motor. Vehicle EV on which power supply device 100 illustrated in this drawing is mounted includes vehicle main body 91, travel motor 93 that causes vehicle main body 91 to travel, wheels 97 that are driven by motor 93, power supply device 100 that supplies electric power to motor 93, and power generator 94 that charges the batteries of power supply device 100. Power supply device 100 is connected to motor 93 and power generator 94 via DC/AC inverter 95. Motor 93 is driven by electric power supplied from power supply device 100. Power generator 94 is driven by the energy at the time of applying regenerative braking to vehicle EV, and charges the batteries of power supply device 100. Vehicle EV further includes charging plug 98, and power supply device 100 can be charged by connecting charging plug 98 to an external power supply.

Power Supply Device for Power Storage Device

Figure 11:
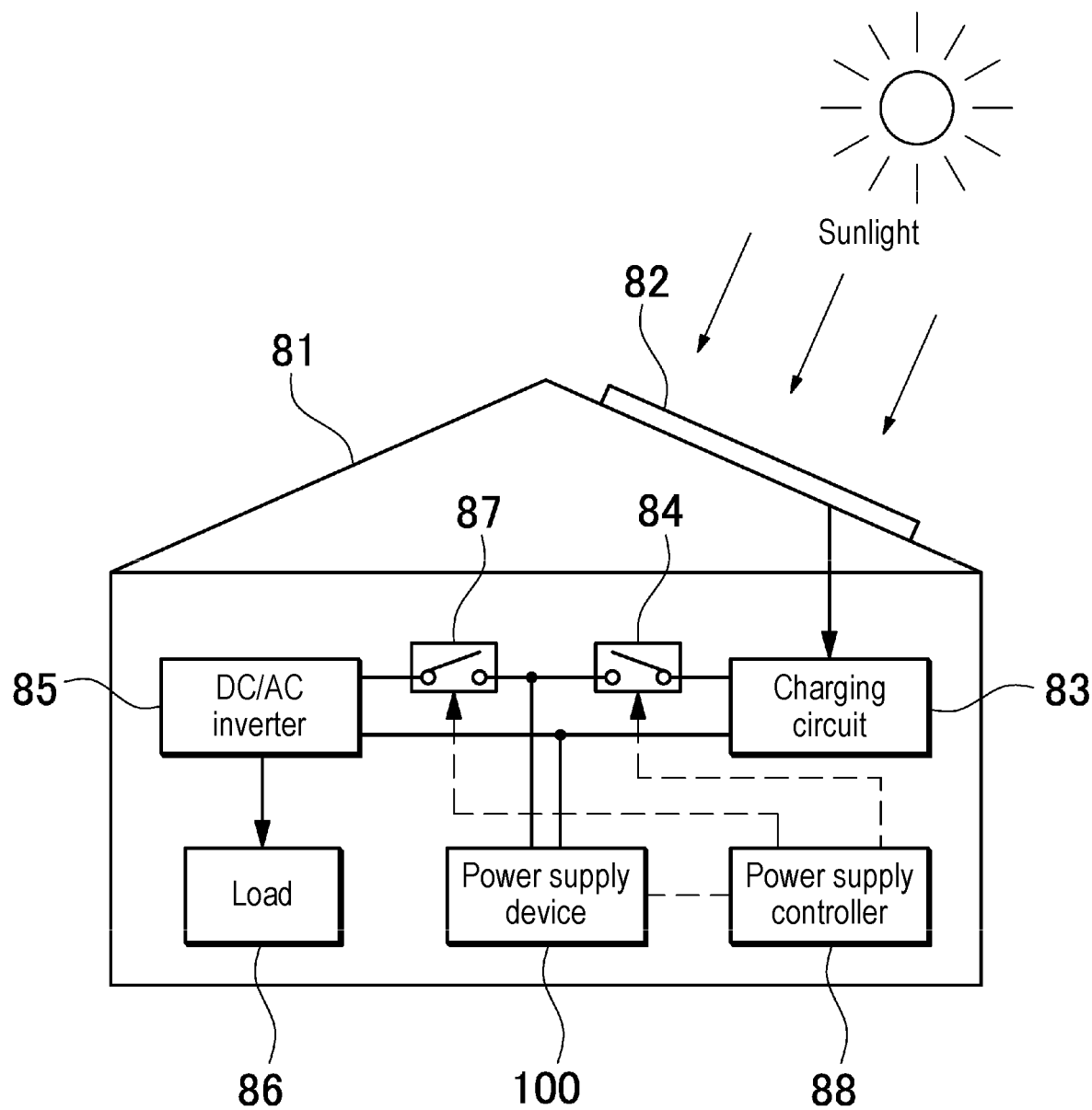
FIG. 11 is a block diagram illustrating an example of application to a power supply device for power storage.
Figure 12:
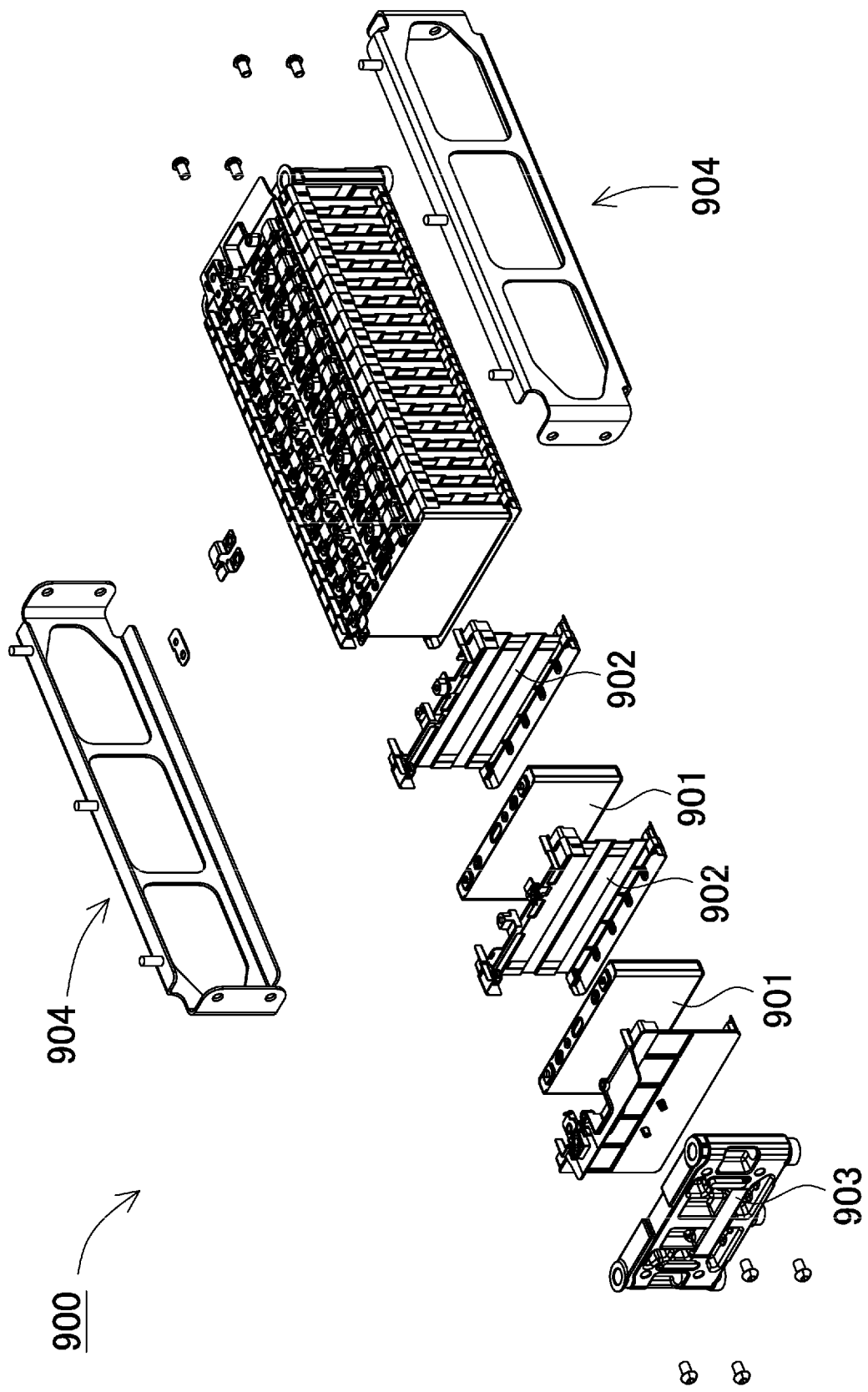
FIG. 12 is an exploded perspective view illustrating a conventional power supply device.
Figure 13:
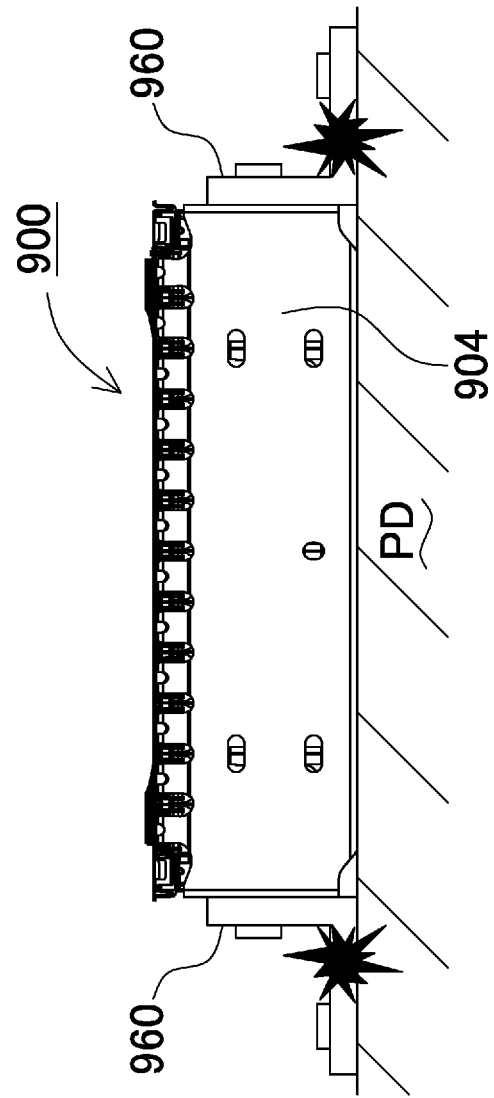
FIG. 13 is a side view illustrating a state in which a power supply device is fixed to an electric vehicle or the like via a bracket.

The application of the power supply device of the present invention is not limited to a power supply for a motor that causes the vehicle to travel. The power supply device according to the exemplary embodiment can be used also as a power supply for a power storage device that charges a battery with electric power generated by photovoltaic power generation, wind power generation, or the like, and stores electricity. FIG. 11 illustrates a power storage device that charges a battery of power supply device 100 with solar cell 82 and stores electricity.

The power storage device illustrated in FIG. 11 charges the battery of power supply device 100 with electric power generated by solar cell 82 arranged on a roof, a rooftop, or the like of building 81 such as a house or a factory. In this power storage device, the battery of power supply device 100 is charged by charging circuit 83 using solar cell 82 as a charging power supply, and then electric power is supplied to load 86 via DC/AC inverter 85. Thus, this power storage device includes a charge mode and a discharge mode. In the power storage device shown in the drawings, DC/AC inverter 85 and charging circuit 83 are connected to power supply device 100 via discharging switch 87 and charging switch 84, respectively. Discharging switch 87 and charging switch 84 are turned on and off by power supply controller 88 of the power storage device. In the charge mode, power supply controller 88 turns on charging switch 84 and turns off discharging switch 87 to allow charging from charging circuit 83 to power supply device 100. When charging is completed and the battery is fully charged or when the battery is in a state where a capacity of a predetermined value or greater is charged, power supply controller 88 turns off charging switch 84 and turns on discharging switch 87 to switch the mode to the discharge mode and allows discharging from power supply device 100 to load 86. When necessary, power supply controller 88 can supply electric power to load 86 and charge power supply device 100 simultaneously by turning on charging switch 84 and turning on discharging switch 87.

Although not illustrated, the power supply device can also be used as a power supply of a power storage device that performs power storage by charging a battery using midnight electric power at night. The power supply device that is charged with midnight electric power is charged with the midnight electric power that is surplus electric power generated by a power station, and outputs the electric power during the daytime when an electric power load increases. Accordingly, peak electric power during the daytime can be limited to a small value. The power supply device can also be used as a power supply charged with both output of a solar battery and the midnight electric power. This power supply device can efficiently perform power storage effectively using both electric power generated by the solar battery and the midnight electric power in consideration of weather and electric power consumption.

The power storage system as described above can be suitably used in applications such as a backup power supply device that can be installed in a rack of a computer server, a backup power supply device for a radio base station for a cellular phone or the like, a power storage power supply for use in a house or a factory, a power storage device combined with a solar battery such as a power supply for street lights, and a backup power supply for traffic lights and traffic indicators on roads.

INDUSTRIAL APPLICABILITY

The power supply device according to the present invention and a vehicle including the same are suitably used as a large-current power supply used for a power supply of a motor for driving an electric vehicle such as a hybrid vehicle, a fuel cell automobile, an electric automobile, and an electric motorcycle. Examples of the power supply device include a power supply device for a plug-in hybrid electric automobile and a hybrid electric automobile capable of switching a traveling mode between an EV traveling mode and an HEV traveling mode, and a power supply device for an electric automobile. Furthermore, the power storage system can also be appropriately used in applications such as a backup power supply device that can be installed in a rack of a computer server, a backup power supply device for a radio base station for a cellular phone or the like, a power storage power supply for use in a house or a factory, a power storage device combined with a solar battery such as a power supply for street lights, and a backup power supply for traffic lights and the like.

REFERENCE MARKS IN THE DRAWINGS

100, 700, 900: power supply device
1: battery cell
1X: terminal face
1a: outer covering can
1b: sealing plate
2: electrode terminal
5: connecting structure
6: plate fixing mechanism
10: battery stack
14: battery-side plate
15: fastening member
15a: fastening main surface
15b: end plate locking member
15c: pressing member
15d: lower plate connecting member
15f: fastening member screw hole
15g: cutout
16: insulating spacer
17: end face spacer
20: end plate
40: heat transfer sheet
42: low friction resistance region
50: lower plate
51: plate fixing screw hole
52: second hole part
53: round hole screw
60, 760, 960: bracket
62: plate fixing bolt
62a: screw head
62b: screw groove part
63: bracket fixing hole
81: building
82: solar battery
83: charging circuit
84: charging switch
85: DC/AC inverter
86: load
87: discharging switch
88: power supply controller
91: vehicle main body
93: motor
94: power generator
95: DC/AC inverter
96: engine
97: wheel
98: charging plug
901: battery cell
902: spacer
903: end plate
704, 904: bind bar
PD: power supply target equipment
DI: recessed part
d1: height
d2, d3: gap
HV, EV: vehicle

The invention claimed is:

1. A power supply device to be fixed to a power supply target equipment, the power supply device comprising:
   a plurality of battery cells each including an outer covering can of a prismatic shape;
   a pair of end plates that covers both side end faces of a battery stack includes the plurality of battery cells stacked;
   a lower plate that covers a lower face of the battery stack;
   a plurality of fastening members that are plates extending in a stacking direction of the plurality of battery cells and are arranged on opposed side faces of the battery stack, the fastening members configured to fasten the end plates to each other in a state where the battery stack is placed on an upper surface of the lower plate; and
   a plate fixing mechanism for fixing the lower plate to a power supply target equipment; and
   a connecting structure configured to connect the lower plate and the fastening members to each other in a state where a displacement between the lower plate and the fastening members is allowed,
   wherein for each of the fastening members, the connecting structure includes:
      a pair of elongated holes included in either one of the each of fastening members and the lower plate, each of the pair of elongated holes elongated in a stacking direction of the plurality of battery cells;

a pair of hole parts included in the other of the each of fastening members and the lower plate at a position corresponding to the pair of elongated holes;

a pair of elongated hole screws each passing through a corresponding one of the pair of elongated holes and a corresponding one of the pair of hole parts and threadedly engaged in a state where a relative displacement, in the stacking direction of the plurality of battery cells, between the lower plate and the each of fastening members at an interface therebetween is allowed;

a round hole included in either one of the each of fastening members and the lower plate; and a round hole screw threadedly engaged at a position corresponding to the round hole in the other of the each of fastening members and the lower plate, wherein the round hole is positioned at a center part between the pair of elongated holes, wherein the pair of elongated holes are respectively positioned at both end parts in the stacking direction of the plurality of battery cells in either one of the each of fastening members and the lower plate, and wherein the pair of elongated hole screws are threadedly engaged with either one of the each of fastening members and the lower plate at positions corresponding to the pair of elongated holes.

2. The power supply device according to claim 1, wherein the plate fixing mechanism includes:

a bracket for fixing the lower plate to a power supply target equipment; and a fixing jig for fixing the lower plate and the bracket to each other.

3. The power supply device according to claim 2, wherein the bracket is fixed in an orientation that the bracket protrudes from each of the pair of end plates.

4. The power supply device according to claim 2, the plate fixing mechanism including:

the lower plate including a plate fixing screw hole;

a bracket fixing hole opened in the bracket;

a plate fixing bolt inserted into the plate fixing screw hole and the bracket fixing hole, wherein an upper surface of the plate fixing bolt inserted into the plate fixing screw hole and the bracket fixing hole is lower in height than a main surface of the lower plate.

5. The power supply device according to claim 1, wherein the plate fixing mechanism and the connecting structure are coaxially formed, a plate fixing screw hole forming the plate fixing mechanism and formed in the lower plate is a hole part forming the connecting structure and formed in the lower plate, and a plate fixing bolt forming the plate fixing mechanism and inserted into the plate fixing screw hole and the bracket fixing hole is an elongated hole screw that is made to pass through the hole part forming the connecting structure and is threadedly engaged in a state where a relative displacement between the lower plate and the each of the fastening members at an interface therebetween is allowed.

6. The power supply device according to claim 1, further comprising a heat transfer sheet interposed between an upper surface of the lower plate and a lower surface of the battery stack to bring the lower plate and the battery stack into a heat-bonded state.

7. The power supply device according to claim 6, wherein the heat transfer sheet includes an insulating member including elasticity.

8. The power supply device according to claim 1, wherein the battery stack as viewed in a plan view includes an aspect ratio of a rectangular shape equal to or more than 5.

9. A vehicle including the power supply device according to claim 1, the vehicle comprising:

the power supply device; a motor for traveling supplied with electric power from the power supply device; a vehicle main body mounted with the power supply device and the motor; and a wheel that is driven by the motor to cause the vehicle main body to travel.

10. A power storage device including the power supply device according to claim 1, the power storage device comprising: the power supply device; and a power supply controller that controls charging to and discharging from the power supply device, wherein the power supply controller enables charging to the battery cells with electric power from an outside, and controls charging to the battery cells.

11. The power supply device according to claim 1, wherein the pair of elongated holes and the round hole are formed in a single surface of either one of the each of fastening members and the lower plate.

* * * * *